United States Patent
Amitani

(10) Patent No.: US 7,260,821 B2
(45) Date of Patent: Aug. 21, 2007

(54) DISK DRIVING APPARATUS

(75) Inventor: Yosuke Amitani, Saitama (JP)

(73) Assignee: Pioneer Corporation, Tokyo (JP)

( * ) Notice: Subject to any disclaimer, the term of this patent is extended or adjusted under 35 U.S.C. 154(b) by 332 days.

(21) Appl. No.: 11/084,195

(22) Filed: Mar. 21, 2005

(65) Prior Publication Data

US 2005/0216927 A1 Sep. 29, 2005

(30) Foreign Application Priority Data

Mar. 22, 2004 (JP) ............................ P2004-083433

(51) Int. Cl.
*G11B 33/08* (2006.01)
(52) U.S. Cl. .................................... 720/651
(58) Field of Classification Search ................ 720/651, 720/692, 688, 689, 693, 694, 698; 369/247.1, 369/263.1, 254
See application file for complete search history.

(56) References Cited

U.S. PATENT DOCUMENTS

| | | | | |
|---|---|---|---|---|
| 4,719,526 A | * | 1/1988 | Okita et al. ................. | 720/651 |
| 6,045,113 A | * | 4/2000 | Itakura ........................ | 248/635 |
| 6,690,638 B1 | * | 2/2004 | Kiyomiya et al. .......... | 720/651 |
| 6,785,217 B1 | * | 8/2004 | Kao et al. ................... | 720/651 |
| 6,834,393 B2 | * | 12/2004 | Akimaru et al. ............ | 720/698 |
| 6,859,933 B2 | * | 2/2005 | Park et al. .................. | 720/651 |
| 2003/0012120 A1 | * | 1/2003 | Chen et al. ................. | 369/247 |
| 2003/0076773 A1 | * | 4/2003 | Moriyama et al. .......... | 369/263 |
| 2003/0161253 A1 | * | 8/2003 | Liao et al. .................. | 369/263 |
| 2003/0193879 A1 | * | 10/2003 | Huang et al. ............... | 369/263 |
| 2004/0047277 A1 | * | 3/2004 | Kiyomiya et al. .......... | 369/247 |
| 2005/0210489 A1 | * | 9/2005 | Makino ...................... | 720/692 |

FOREIGN PATENT DOCUMENTS

JP  11-328944 A  11/1999

* cited by examiner

*Primary Examiner*—Allen Cao
(74) *Attorney, Agent, or Firm*—Drinker Biddle & Reath LLP

(57) ABSTRACT

A disk driving apparatus includes a base chassis supported in a cabinet through an elastic body, and equipped with a spindle motor to rotate and drive a disk and a pickup moving radially with respect to the disk rotated by the spindle motor. Preferably, the base chassis is provided with a dynamic vibration absorber including an elastic body fixed to the base chassis, and a pendulum plate supported in the base chassis through the elastic body, and the pendulum plate is displaced by external force applied to the cabinet and makes contact with the cabinet ahead of the base chassis.

5 Claims, 6 Drawing Sheets

DISK DRIVING APPARATUS

BACKGROUND OF THE INVENTION

1. Field of the Invention

The present invention relates to a disk driving apparatus.

2. Description of the Related Art

A disk driving apparatus for rotating and driving an optical disk and recording or reproducing information with respect to this optical disk requires that accurate recording or reproducing should be performed by suppressing vibration occurring at the time of the driving.

A disk driving apparatus having a structure of reducing vibration at the time of driving has been proposed conventionally (for example, see JP-A-11-328944). The disk driving apparatus described in JP-A-11-328944 is shown in FIGS. 1 and 2.

The disk driving apparatus shown in FIGS. 1 and 2 includes a main frame 3 supported in a cabinet 2 through an elastic member 1. The main frame 3 includes a spindle motor 5 for rotating a turntable 4 on which an optical disk D is fixed. Also, this main frame 3 includes a stepping motor 7 for radially reciprocating a pickup 6 with respect to the optical disk D rotating along with the turntable 4. Then, this pickup 6 moves radially with respect to the rotating optical disk D and information is recorded or reproduced. Also, a sub frame 9 is mounted in an upper surface of the main frame 3 through an elastic member 8, and vibration occurring in the main frame 3 is propagated to this sub frame 9 through the elastic member 8.

In such a disk driving apparatus, vibration propagating from the cabinet 2 to the main frame 3 damps by the elastic member 1, but vibration occurring due to rotation of the spindle motor 5 directly propagates to the main frame 3. Particularly, vibration caused by imbalance of the optical disk D rotating along with the turntable 4 tends to occur in the main frame 3.

Then, in the disk driving apparatus described above, the sub frame 9 has a resonance frequency vibrating in a phase opposite to that of the main frame 3 and thereby, the vibrations of the sub frame 9 and the main frame 3 are canceled and vibration near to the resonance frequency of the sub frame 9 is reduced.

Thus, the disk driving apparatus described above can reduce vibration at the time of driving but, for example, in case of applying a large impact due to a fall etc., there is fear that the main frame 3 supported in the cabinet 2 through the elastic member 1 is displaced in the surface direction due to the impact and makes contact with the inside of the cabinet 2. As a result of this, particularly, a problem that breakage or misalignment of the pickup 6 which is a precision component for recording or reproducing information while moving radially with respect to the rotated optical disk D with high accuracy occurs and recording or reproducing with respect to the disk D cannot accurately be performed is given as one embodiment.

SUMMARY OF THE INVENTION

According to an aspect of the present invention, a disk driving apparatus includes a base chassis supported in a cabinet through an elastic body, and equipped with a spindle motor to rotate and drive a disk and a pickup moving radially with respect to the disk rotated by the spindle motor. Preferably, the base chassis is provided with a dynamic vibration absorber including an elastic body fixed to the base chassis, and a pendulum plate supported in the base chassis through the elastic body, and the pendulum plate is displaced by external force applied to the cabinet and makes contact with the cabinet ahead of the base chassis.

DETAILED DESCRIPTION OF THE INVENTION

Figure 1:
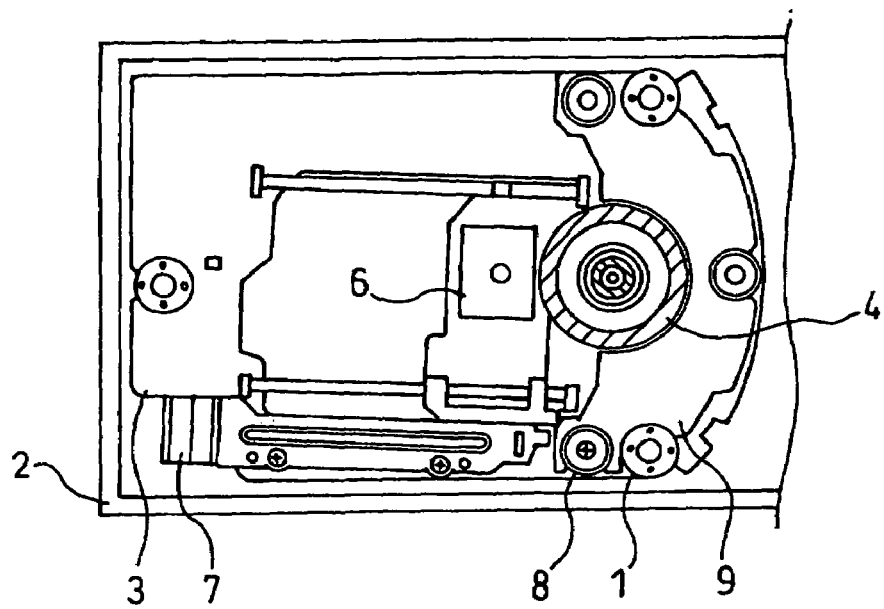
FIG. 1 is a plan view describing a structure of a conventional disk driving apparatus.
Figure 2:
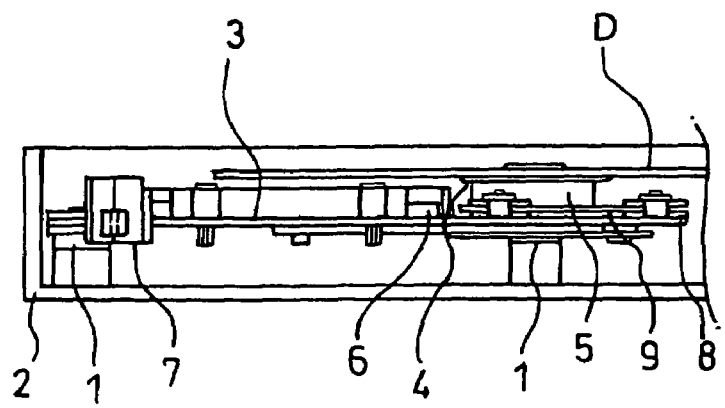
FIG. 2 is a sectional view describing the structure of the conventional disk driving apparatus.

An embodiment of a disk driving apparatus according to the invention will be described.

In a disk driving apparatus of the invention, a base chassis is supported in a cabinet through an elastic body, and equipped with a spindle motor to rotate and drive a disk and a pickup moving radially with respect to the disk rotated by the spindle motor. The base chassis is provided with a dynamic vibration absorber including an elastic body fixed to the base chassis, and a pendulum plate supported in the base chassis through the elastic body, and the pendulum plate is displaced by external force applied to the cabinet and makes contact with the cabinet ahead of the base chassis.

By such a configuration, even in case of applying external force such as large impact force due to a fall etc. to the disk driving apparatus, the dynamic absorption pendulum plate makes contact with the cabinet ahead of the base chassis and thereby, the vibration absorption elastic body absorbs the external force through the dynamic absorption pendulum plate, and force propagated to the base chassis equipped with the pickup which is a precision component for recording or reproducing information with respect to a disk can be reduced significantly.

As a result of this, breakage or misalignment of the pickup due to the external force can surely be prevented and failure of the disk driving apparatus can be reduced.

Also, a distance between the dynamic absorption pendulum plate and the cabinet in the same direction as the direction in which a distance between the base chassis and the cabinet becomes a minimum distance could be set at a distance narrower than the minimum distance between the base chassis and the cabinet. Alternatively, the amount of displacement of the dynamic absorption pendulum plate displaced by the external force applied to the cabinet could be set larger than the amount of displacement of the base chassis displaced by the external force applied to the cabinet. By any of these configurations, the dynamic absorption pendulum plate can be brought into contact with the cabinet ahead of the base chassis without disposing a special component for impact absorption. As a result of that, failure of the disk driving apparatus can be reduced easily and it is also effective in cost.

Also, when a direction in which the dynamic absorption pendulum plate is displaced and makes contact with the cabinet is set in a direction along a direction of movement of the pickup, it is easy to prevent a reduction in accuracy of movement of the pickup for performing recording or reproducing while moving in a radial direction of a disk.

Also, an elastic material could be interposed in a place of contact between the dynamic absorption pendulum plate and the cabinet. In this case, at the time of action of external force, the dynamic absorption pendulum plate makes contact with the cabinet through the elastic material and thereby, the external force applied to the dynamic absorption pendulum plate from the cabinet can first be reduced by the elastic material. As a result of this, the external force propagated to the base chassis can be reduced further and failure of the disk driving apparatus can be prevented more effectively.

EMBODIMENT

A disk driving apparatus according to one embodiment of the invention will be described below in detail with reference to the drawings.

Figure 3:
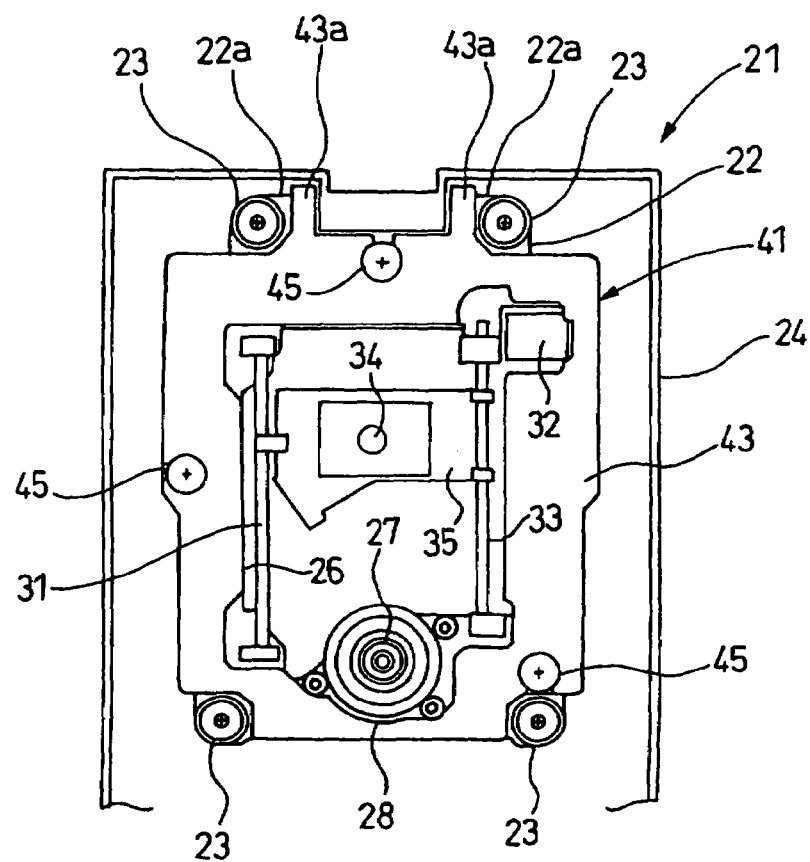
FIG. 3 is a plan view of a disk driving apparatus according to one embodiment of the invention.
Figure 4:
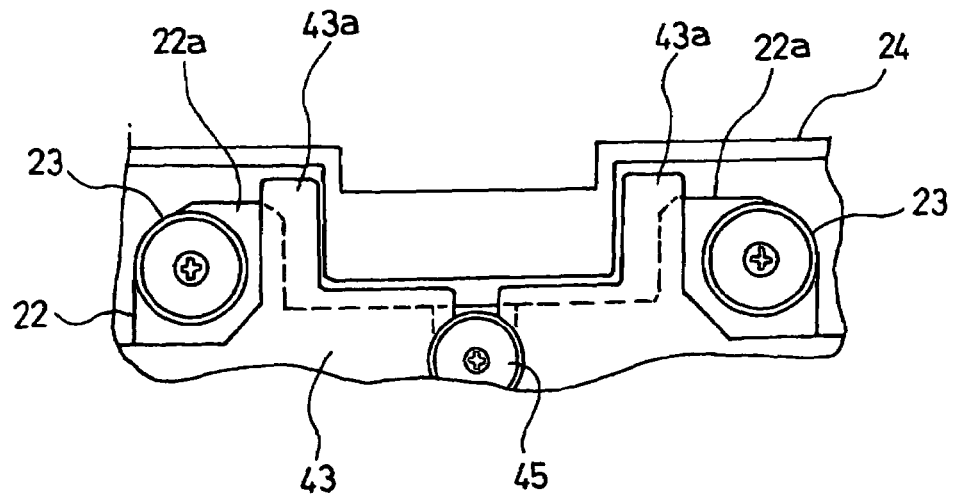
FIG. 4 is a partial plan view partially enlarging the disk driving apparatus according to the embodiment of the invention.
Figure 5:
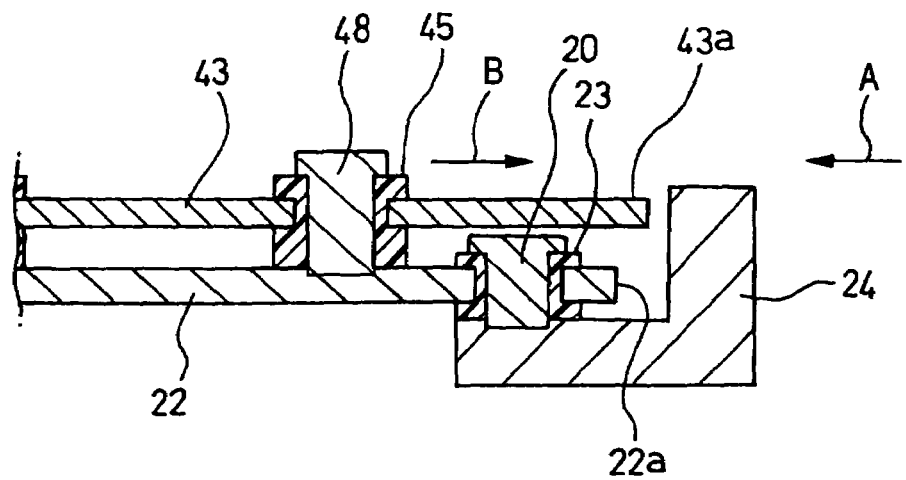
FIG. 5 is a partially schematic sectional view schematically showing the disk driving apparatus according to the embodiment of the invention.
Figure 6:
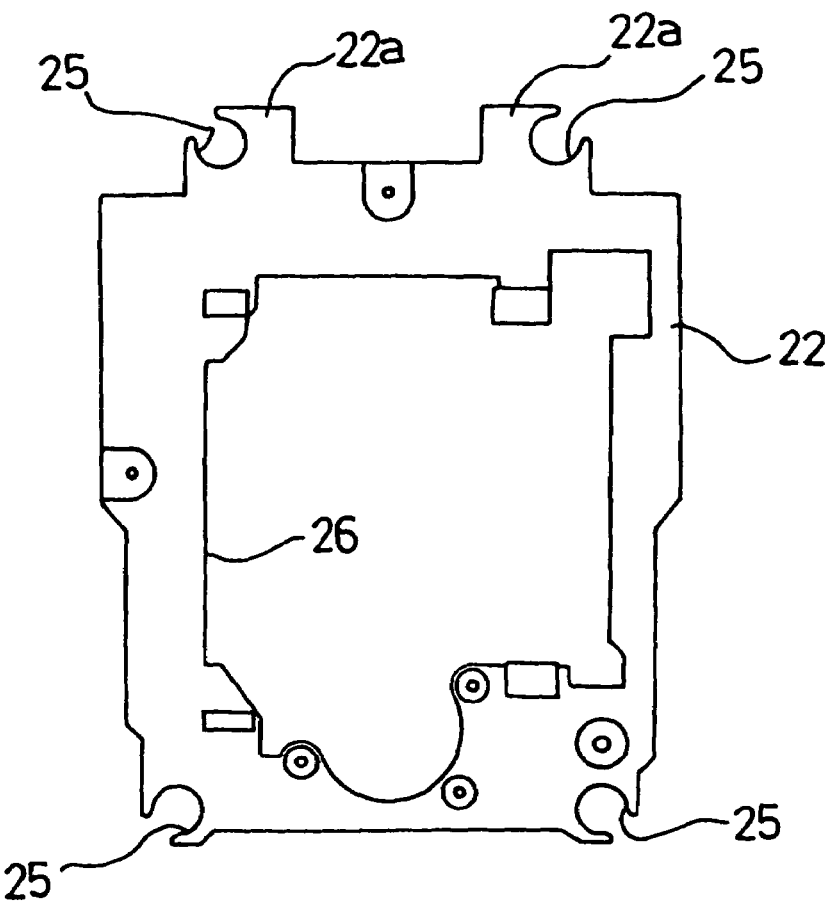
FIG. 6 is a plan view of a base chassis in FIG. 3.
Figure 7:
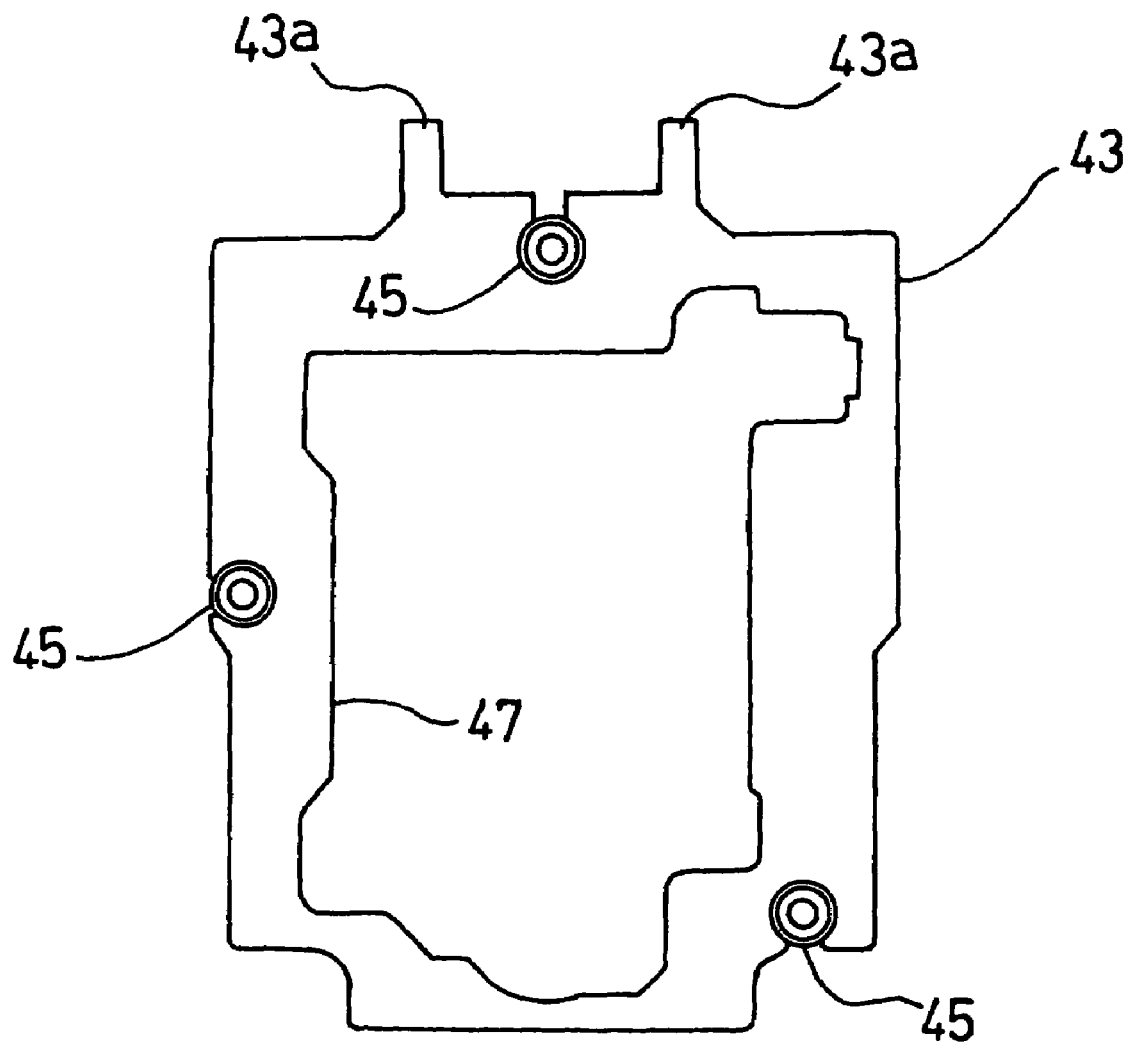
FIG. 7 is a plan view of a dynamic absorption pendulum plate in FIG. 3.

FIG. 3 is a plan view of a disk driving apparatus according to the embodiment of the invention, and FIG. 4 is a partial plan view partially enlarging the disk driving apparatus, and FIG. 5 is a partially schematic sectional view schematically showing the disk driving apparatus, and FIG. 6 is a plan view of a base chassis in FIG. 3, and FIG. 7 is a plan view of a dynamic absorption pendulum plate in FIG. 3.

As shown in FIGS. 3 to 5, a disk driving apparatus 21 of the present embodiment includes a base chassis 22 inside a cabinet 24 forming an outer shell. This base chassis 22 is supported in the cabinet 24 through elastic bodies 23 made of, for example, rubber fixed to the cabinet 24 by fixed members 20. As shown in FIG. 6, the base chassis 22 is formed in a frame shape and mounting parts 25 in which the elastic bodies 23 are mounted are formed in the outer circumference.

The base chassis 22 has an opening 26 and a spindle motor 28 for rotating a turntable 27 is fixed to one end of this opening 26. A disk can be attached to and detached from the turntable 27 and by rotating the turntable 27 through the spindle motor 28, the disk mounted in this turntable 27 is rotated along with the turntable 27.

Also, in the opening 26 of the base chassis 22, a guide rail 31 is disposed in one side portion the opening. Also, a ball screw 33 rotated by a stepping motor 32 is disposed in the other side portion of the opening 26. Then, a bracket 35 having a pickup 34 is supported in these guide rail 31 and ball screw 33 and by rotating the ball screw 33 by the stepping motor 32, the pickup 34 is moved radially along a surface of the disk mounted in the turntable 27 along with the bracket 35. Then, this pickup 34 optically records or reproduces information while moving radially with respect to the surface of the disk rotated by the spindle motor 28.

The base chassis 22 includes a dynamic vibration absorber 41 in the upper side. This dynamic vibration absorber 41 is made of a dynamic absorption pendulum plate 43 and vibration absorption elastic bodies 45, and the dynamic absorption pendulum plate 43 is formed in a frame shape having an opening 47 as shown in FIG. 7. Then, this dynamic absorption pendulum plate 43 is supported in the base chassis 22 through the vibration absorption elastic bodies 45 fixed to the base chassis 22 by fixed members 48.

The dynamic vibration absorber 41 is set so as to have a resonance frequency vibrating in a phase opposite to that of the base chassis 22 in a frequency band of vibration of the base chassis 22 occurring in a band of the number of revolutions of use of the spindle motor 28. Mass of the dynamic absorption pendulum plate 43 or an elastic modulus (rigidity) of the elastic body 45 could be changed in order to set the resonance frequency of the dynamic vibration absorber 41 at a desired value. Or, arrangement or shape of the elastic body 45 or the dynamic absorption pendulum plate 43 could be changed.

Then, by mounting the dynamic vibration absorber 41 having the resonance frequency vibrating in the phase opposite to that of the base chassis 22 thus, vibration of the base chassis 22 is suppressed by the dynamic vibration absorber 41.

Also, as shown and enlarged in FIG. 4, the dynamic absorption pendulum plate 43 forming this dynamic vibration absorber 41 has a pair of protrusions 43a. Incidentally, FIG. 4 shows a place in which a distance between the base chassis 22 and the cabinet 24 becomes a minimum distance. The protrusions 43a protrude in the same direction as the direction (vertical direction in the drawing) in which a distance between the base chassis 22 and the cabinet 24 becomes a minimum distance. Also, a protrusion direction of this protrusion 43a is set in a direction along a direction of movement of the pickup 34.

Then, a distance between the protrusions 43a of this dynamic absorption pendulum plate 43 and the cabinet 24 in the protrusion direction becomes narrower than a minimum distance between the ends 22a of the base chassis 22 and the cabinet 24.

When impact force (external force) is applied to the cabinet 24 from a plane direction (for example, direction of arrow A in FIG. 5) of the base chassis 22 due to, for example, a fall in the disk driving apparatus 21 with such a structure, the base chassis 22 and the dynamic absorption pendulum 43 are displaced in a direction (for example, direction of arrow B in FIG. 5) opposite to that of the impact force with respect to the cabinet 24 due to the inertia force.

Here, the distance between the protrusions 43a and the cabinet 24 is narrower than a distance between the ends 22a of the base chassis 22 and the cabinet 24 and thereby, the dynamic absorption pendulum plate 43 makes contact with the cabinet 24 ahead of the base chassis 22 in the case of being displaced due to the impact force.

Then, in this manner, the dynamic absorption pendulum plate 43 makes contact with the cabinet 24 and thereby, the impact force is absorbed by the vibration absorption elastic bodies 45 through the dynamic absorption pendulum plate 43 and the impact force propagated to the base chassis 22 is reduced significantly. Also, the dynamic absorption pendulum plate 43 makes contact with the cabinet 24 and rebounds ahead of the base chassis 22 and thereby, its rebound force acts on the base chassis 22 through the vibration absorption elastic bodies 45 and the fixed members 20 and force of a direction in which the base chassis 22 moves toward the cabinet 24 is weakened. As a result of that, even in the case that the base chassis 22 makes contact with the cabinet 24, force applied to the base chassis 22 in that case weakens.

As described above, according to the disk driving apparatus 21 of the embodiment, even in case of applying external force such as large impact force due to a fall etc., the dynamic absorption pendulum plate 43 makes contact with the cabinet 24 ahead of the base chassis 22 and thereby, the vibration absorption elastic bodies 45 absorb the external force through the dynamic absorption pendulum plate 43, and the external force propagated to the base chassis 22 equipped with the pickup 34 which is a precision component for recording or reproducing information with respect to a disk can be reduced significantly.

As a result of this, breakage or misalignment of the pickup 34 due to the external force can surely be prevented and failure of the disk driving apparatus 21 can be reduced.

In addition, the distance between the protrusions 43a of the dynamic absorption pendulum plate 43 and the cabinet 24 is only set at a distance narrower than the distance between the ends 22a of the base chassis 22 and the cabinet 24 without disposing a special component for impact absorption, so that 20 it is also effective in cost.

Also, a direction of displacement of the dynamic absorption pendulum plate 43 and the base chassis 22 due to the external force applied to the cabinet 24 is aligned with a direction of movement of the pickup 34, so that a bad influence 25 on accuracy of movement of the pickup 34 for performing recording or reproducing while moving in a radial direction of a disk can be minimized.

Figure 8:
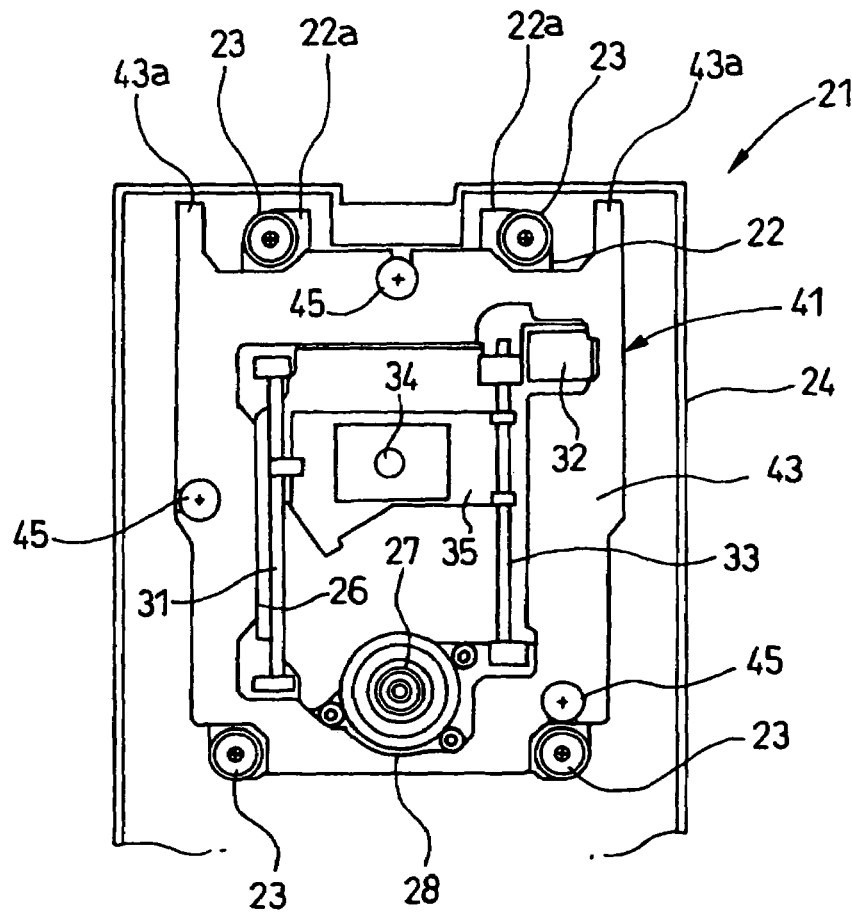
FIG. 8 is a plan view of a disk driving apparatus showing a modified embodiment of a disk driving apparatus according to the embodiment.

Incidentally, a position of formation of the protrusions 43a of the dynamic absorption pendulum plate 43 is not limited to the embodiment described above as long as the protrusions are protruded in the same direction as the direction in which the distance between the ends 22a of the base chassis 22 and the cabinet 24 becomes the minimum distance and, for example, as shown in FIG. 8, the protrusions may be disposed in both sides of the base chassis 22.

Next, another embodiment of the disk driving apparatus 21 will be described.

Figure 9:
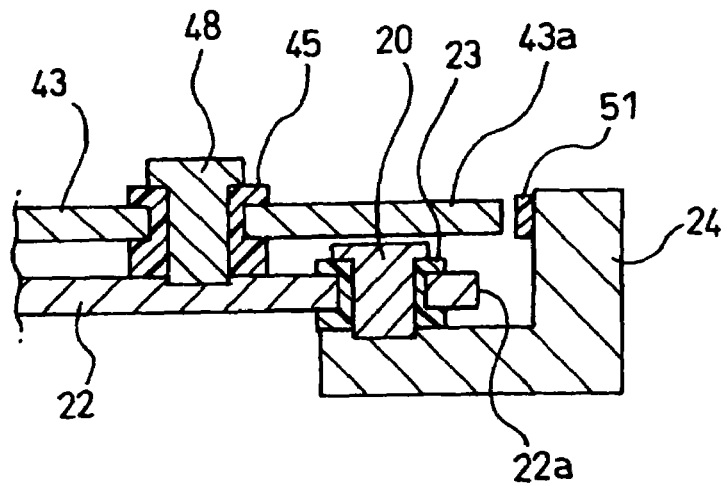
FIG. 9 is a partially schematic sectional view schematically showing a disk driving apparatus showing another embodiment.
Figure 10:
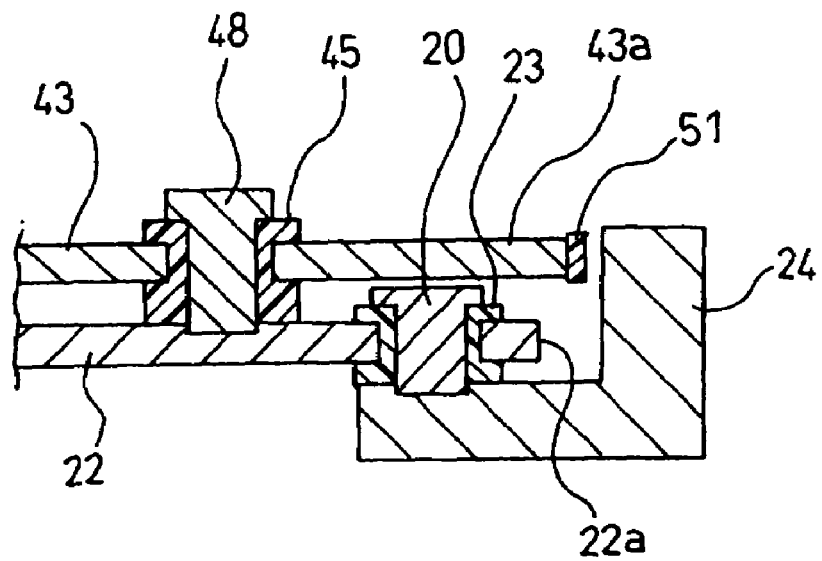
FIG. 10 is a partially schematic sectional view schematically showing a disk driving apparatus showing another embodiment.

In a disk driving apparatus shown in FIG. 9, an elastic material 51 is disposed in an inner surface of a cabinet 24 opposed to an end face of a dynamic absorption pendulum plate 43, and in a disk driving apparatus shown in FIG. 10, an elastic material 51 is mounted in an end face of a dynamic absorption pendulum plate 43.

In any of these disk driving apparatus 21, the elastic material 51 is disposed between the dynamic absorption pendulum plate 43 and the cabinet 24, so that at the time of action of external force, the dynamic absorption pendulum plate 43 makes contact with the cabinet 24 through the elastic material 51 and thereby, the external force itself applied to the dynamic absorption pendulum plate 43 can also be reduced. As a result of this, the external force propagated to the base chassis 22 can be reduced further and failure of the disk driving apparatus 21 can be prevented further.

Figure 11:
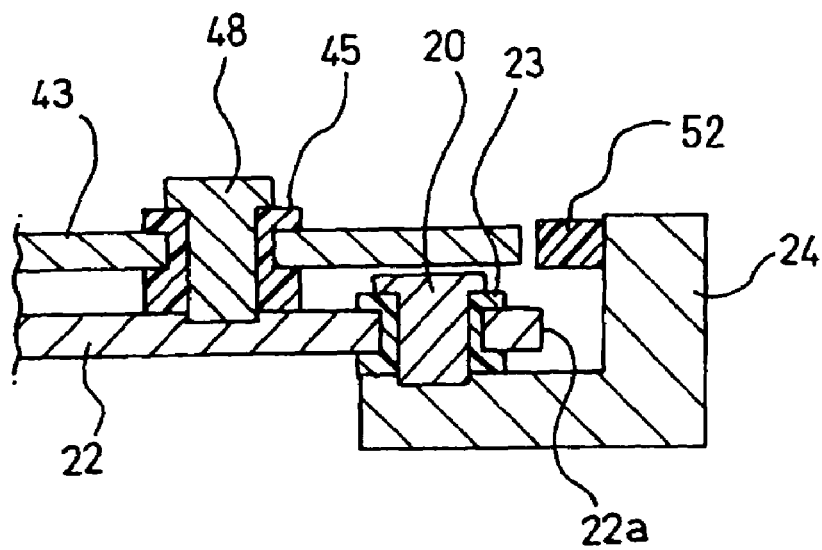
FIG. 11 is a partially schematic sectional view schematically showing a disk driving apparatus showing another embodiment.

In a disk driving apparatus shown in FIG. 11, a thick elastic material 52 is disposed in an inner surface of a cabinet 24 opposed to an end face of a dynamic absorption pendulum plate 43 and a distance between this elastic material 52 and the dynamic absorption pendulum plate 43 is set at a distance narrower than a minimum distance between a base chassis 22 and the cabinet 24.

Then, according to this structure, at the time of action of external force, the dynamic absorption pendulum plate 43 makes contact with the cabinet 24 through the elastic material 52 ahead of the base chassis 22 and thereby, the external force propagated to the base chassis 22 can be absorbed by an elastic body 45 and the elastic material 52 to be reduced significantly.

Incidentally, in the disk driving apparatus shown in FIG. 11, the elastic material 52 is mounted in the side of the cabinet 24, but similar effect can also be obtained when the elastic material 52 is mounted in the side of the dynamic absorption pendulum plate 43.

Also, a structure in which the dynamic absorption pendulum plate 43 is brought into contact with the cabinet 24 ahead of the base chassis 22 at the time of action of external force is not limited to the embodiment described above.

It may be constructed so as to bring the dynamic absorption pendulum plate 43 into contact with the cabinet 24 ahead of the base chassis 22 at the time of action of external force by setting the amount of displacement of the dynamic absorption pendulum plate 43 displaced due to the external force applied to the cabinet 24 larger than the amount of displacement of the base chassis 22 displaced due to the external force applied to the cabinet 24, for example, by adjusting elastic modulus of the vibration absorption elastic bodies 45 and the elastic body 23.

In this case, the external force propagated to the base chassis 22 can also be reduced significantly by bringing the dynamic absorption pendulum plate 43 into contact with the cabinet 24 ahead of the base chassis 22 surely at the time of action of the external force.

What is claimed is:

1. A disk driving apparatus comprising:
   a base chassis supported in a cabinet through an elastic body, and equipped with a spindle motor to rotate and drive a disk and a pickup moving radially with respect to the disk rotated by the spindle motor, wherein
   the base chassis is provided with a dynamic vibration absorber including:
   an elastic body fixed to the base chassis; and
   a pendulum plate supported in the base chassis through the elastic body, and
   the pendulum plate is displaced by an external force applied to the cabinet and makes contact with the cabinet ahead of the base chassis.

2. The disk driving apparatus according to claim 1, wherein
   a distance between the pendulum plate and the cabinet in a direction in which a distance between the base chassis and the cabinet becomes a minimum distance is narrower than the minimum distance between the base chassis and the cabinet.

3. The disk driving apparatus according to claim 1, wherein
   an amount of displacement of the pendulum plate displaced by the external force applied to the cabinet is larger than an amount of displacement of the base chassis displaced by the external force applied to the cabinet.

4. The disk driving apparatus according to claim 1, wherein
   a direction in which the pendulum plate is displaced and makes contact with the cabinet is a direction along a direction of movement of the pickup.

5. The disk driving apparatus according to claim 1, wherein
   an elastic material is interposed in a place of contact between the pendulum plate and the cabinet.

* * * * *